(12) United States Patent
Bonnizzio

(10) Patent No.: US 8,398,763 B1
(45) Date of Patent: Mar. 19, 2013

(54) MIXTURE AND METHOD FOR INCREASING TRACTION

(75) Inventor: Douglas J. Bonnizzio, Little Rock, AR (US)

(73) Assignee: Unstuck, LLC, Little Rock, AR (US)

( * ) Notice: Subject to any disclaimer, the term of this patent is extended or adjusted under 35 U.S.C. 154(b) by 0 days.

(21) Appl. No.: 13/506,406

(22) Filed: Apr. 17, 2012

Related U.S. Application Data

(60) Provisional application No. 61/517,333, filed on Apr. 18, 2011.

(51) Int. Cl.
*C09K 3/14* (2006.01)

(52) U.S. Cl. .................. 106/36; 106/286.6; 106/287.34; 106/675; 106/788; 106/796

(58) Field of Classification Search ............ 106/36, 106/286.6, 287.34, 675, 788, 796, 817
See application file for complete search history.

(56) References Cited

U.S. PATENT DOCUMENTS

| | | | | |
|---|---|---|---|---|
| 3,878,147 A | * | 4/1975 | Craven | 523/150 |
| 4,243,415 A | * | 1/1981 | Lowe, Jr. | 106/36 |
| 4,781,759 A | * | 11/1988 | Smith | 106/36 |
| 4,936,915 A | * | 6/1990 | Canzani | 106/13 |
| 5,456,744 A | * | 10/1995 | Fattor | 106/36 |
| 5,667,718 A | * | 9/1997 | Jones et al. | 252/70 |
| 6,759,372 B2 | * | 7/2004 | Cotter | 508/143 |
| 6,855,673 B2 | * | 2/2005 | Cotter et al. | 508/143 |
| 7,160,378 B2 | * | 1/2007 | Eadie et al. | 106/36 |
| 7,939,476 B2 | * | 5/2011 | Eadie et al. | 508/110 |

FOREIGN PATENT DOCUMENTS

| | | | |
|---|---|---|---|
| CA | 2129503 A | * | 4/1996 |
| EP | 1526150 A1 | * | 4/2005 |
| GB | 2459193 A | * | 10/2009 |

OTHER PUBLICATIONS

Derwent Acc.No. 2002:724794, abstract of German Patent Specification No. DE 20205718U1 (Jul. 2002).*

\* cited by examiner

*Primary Examiner* — Anthony J Green
(74) *Attorney, Agent, or Firm* — Speed Law Firm

(57) ABSTRACT

Embodiments include a method, mixture, and system for increasing a friction coefficient of a surface or increasing or maintaining traction of an object on the surface. In one embodiment, the mixture comprises pulverized lime, fine sand, granite fines, gypsum, and expanded perlite. The mixture may optionally further comprise dye. In an embodiment, the method comprises mixing pulverized lime, fine sand, granite fines, and gypsum with one another to form a first mixture; and mixing expanded perlite with the first mixture to provide a product mixture for increasing the friction coefficient of the surface or increasing or maintaining traction of an object on the surface. In some embodiments, the expanded perlite may be mixed with dye prior to mixing the expanded perlite with the first mixture.

20 Claims, 4 Drawing Sheets

MIXTURE AND METHOD FOR INCREASING TRACTION

CROSS-REFERENCE TO RELATED APPLICATIONS

This application claims benefit of U.S. provisional patent application Ser. No. 61/517,333, filed Apr. 18, 2011, which is herein incorporated by reference.

BACKGROUND OF THE INVENTION

1. Field of the Invention

Embodiments generally relate to a mixture and method for increasing traction of a vehicle or other object on a surface.

2. Description of the Related Art

Every year, there are thousands of individuals who become stuck in trucks and passenger vehicles in snowy and/or icy conditions. Being stuck in the snow and not reaching their destinations may cost these individuals hundreds of thousands of dollars.

In the case of tractor trailer rigs, when these vehicles are stuck in snowy and/or icy conditions, the consequences are far-reaching. The consequences are also far-reaching when tractor trailer rigs skid on ice and/or snow to the side of the road against guard rails, other vehicles, or are jack-knifed due to lack of traction on a surface on which the vehicle travels. These trucks carry the majority of food and products in every day use across the country to our local stores. If the truck is stuck or disabled due to lack of traction on the surface, that product is not going to reach its destination on time, and the entire truck load may be lost to spoilage. If the product does not reach its destination on time or spoils, store shelves could be empty for days or longer or a price increase on perishable products (e.g., fruit, vegetables, meats) or other commodities may result, driving up the cost for groceries across the nation. Ultimately, stuck vehicles and lack of traction on surfaces on which vehicles travel have a significant impact on our cost of living.

One estimate places over 2.75 million trucks on the road, and roughly 4 to 10 percent of each fleet of trucks may get stuck on a surface (e.g., a road surface) each year due to snowy and/or icy conditions. When a truck gets stuck, an example of what happens is that a tow truck is called for, the driver is idle for about one to three hours at a cost of $75-$125 per hour waiting for the tow truck to move the vehicle, the tow truck company is paid $350-$600 to move the truck from the stuck position (which moving of the truck may only be a distance of about 50-75 feet). This example scenario may result in a total cost of the stuck truck of approximately $425-$700, as well as lost time which is often damaging to the reputation of the transportation company or other person or entity responsible for the transporting of the goods in the truck.

In snowy and/or icy conditions, people often slip on the ice and/or snow and fall. Falling on a surface may lead to injuries, and people may remain helpless on that surface for long periods of time prior to being found.

Additionally, vehicles may slide on the snow and/or ice on a surface, causing injuries and/or vehicle damage. Lack of traction on a surface for vehicles may slow or even stop traffic on roads significantly, and damaged vehicles may cause dangerous disruptions in traffic flow on already hazardous roads. Inclement weather creates many logistical problems in the trucking industry, including failure to keep the trucks moving on the road. One example of disruptions in traffic flow caused by inclement weather conditions includes the problems in Atlanta, Ga. in 2011 where Interstate 40 was backed up for 8 miles and required 13 hours to unscramble.

When a vehicle is stuck on a snowy or icy surface or when it is desired to increase traction on a surface, current options are to spread sand, salt, or even worse corrosive acid blends to melt the snow or ice. Additionally, current options include sand, kitty litter, bleach, or a combination of these, all of which fail at performance by one hour afterward. Kitty litter may in some instances allow tires to move over the surface for about 10 feet, but the tires often become stuck again. If all of these options fail, a tow truck is the last resort at an average cost of $700 to $1,000 per occurrence. The current options are not environmentally friendly, and a tow truck is very expensive.

While it is true that an individual may currently purchase products to combat the problems of ice and snow on a surface at hardware or automotive stores, these products are often hit or miss in efficiency and may be damaging to the environment. One commonly used product is sand. Spreading sand on top of snow or ice may or may not provide the necessary traction to unstick a passenger vehicle out of a rut, but for 18-wheelers, sand is problematic for at least the following reasons. The amount of sand that the truck would have to carry is significant, and it is difficult for a one or two-person crew to spread the sand in the quantities needed. Sand may provide tire traction for only a few feet unless large quantities are applied. Even in significant quantities, the sand may not work, and afterwards it remains on the surface to mix with the snow and/or ice, especially if there is melting and re-freezing of the snow and/or ice. Some experts state that the resulting mixture is more dangerous to drivers due to its still being as slippery as the ice alone but having the coloring and visible texture that may give drivers a false sense of security, leading drivers to underestimate the danger of the surface and underestimate the danger of how fast they are driving.

Another commonly used product is salt, or sodium chloride. While salt shares the same efficiency problems with sand, it is also corrosive and will damage asphalt, concrete, and cars or other vehicles. Moving vehicles across salt often splashes the salt onto the vehicles (e.g., undersides and sides of vehicles), increasing vehicle costs by prematurely corroding and damaging the vehicles.

Other commonly used products include magnesium chloride and calcium chloride. While touted by their producers as safe, they still speed the decay rate of metals, require careful handling, and are detrimental to the environment. These products have environmental implications, as use of these products means spreading a potentially long-lasting chemical or acid onto the ground.

While tow trucks are less damaging to the road surface than the above-mentioned products, they are much more expensive and take time. Each time a tow truck is summoned, the cost is typically approximately $350 to approximately $900 per tow. Additionally, there is the lost time waiting for the tow truck to arrive and the possibility that either the stuck or wrecked vehicle or the tow truck will become a casualty to the road conditions itself.

SUMMARY OF THE INVENTION

Embodiments generally provide a mixture, system, and method for increasing a friction coefficient of a surface or increasing or maintaining traction or gripping ability of a vehicle or other object on a surface.

Some embodiments generally include a mixture for increasing a friction coefficient of a surface, comprising pulverized lime, fine sand, granite fines, gypsum, and expanded perlite.

Some embodiments generally include a method comprising mixing pulverized lime, fine sand, granite fines, and gypsum with one another to form a first mixture; and mixing expanded perlite with the first mixture to provide a product mixture for increasing a friction coefficient of a surface.

BRIEF DESCRIPTION OF THE DRAWINGS

So that the manner in which the above-recited features of embodiments can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
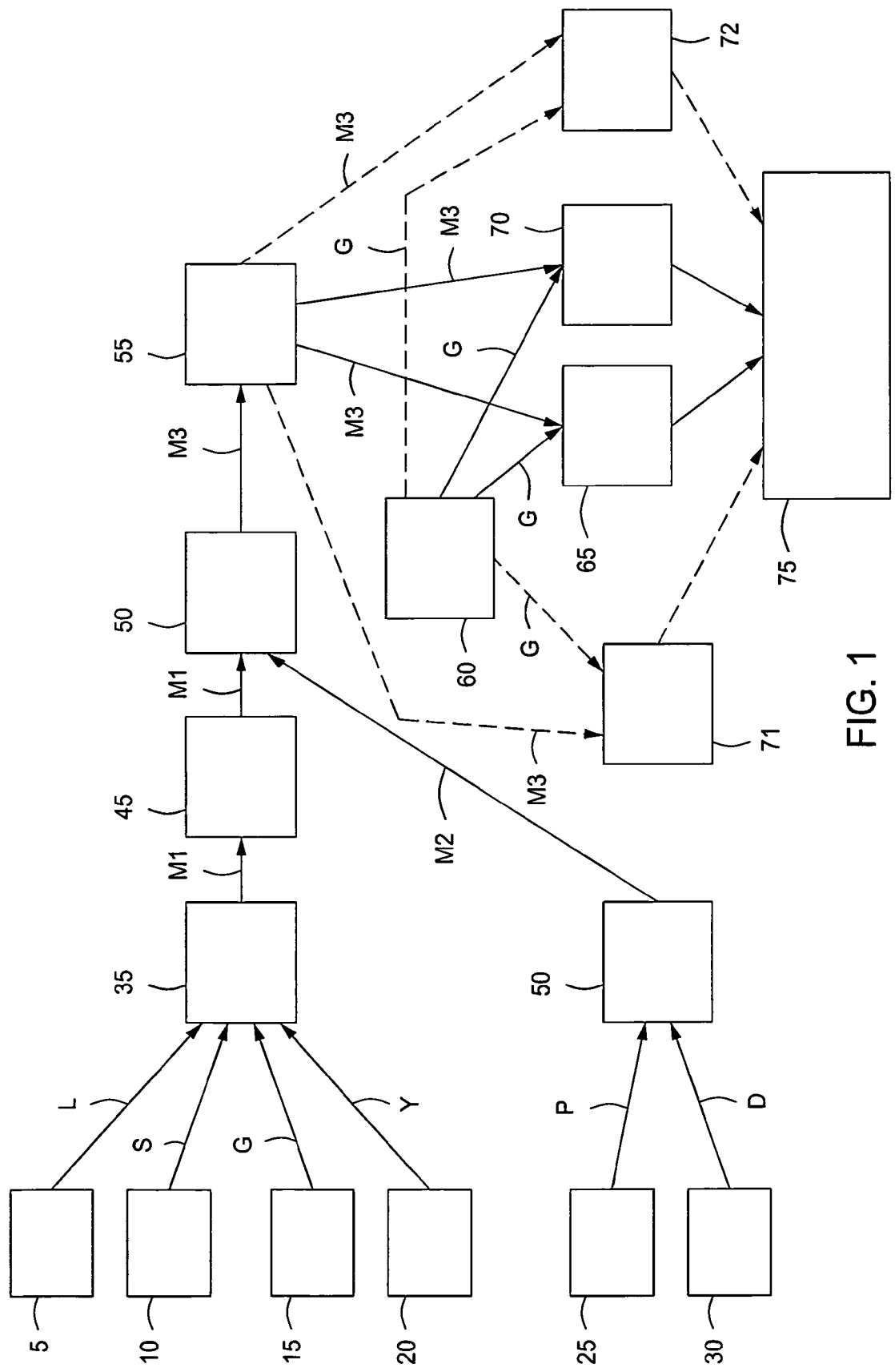
FIG. 1 is a flow diagram of a system and method for making embodiments of the mixture.

Embodiments include a multiple-powdered substance or mixture for allowing objects such as vehicles, in some embodiments road vehicles such as those relying on vulcanized rubber tires, to gain or maintain traction, grip, or gripping ability on a cold, wet, icy, and/or snowy (or otherwise slippery) surface (e.g., a street). The substance or mixture may allow one or more tires of the vehicle to maintain or gain traction or gripping ability on a surface. When one or more vehicles or other objects are stuck in the snow or ice, embodiments allow them to become unstuck. Additionally, the substance or mixture may increase a friction coefficient of a surface or object or increase the ability of an object or vehicle to grip on a surface (e.g., as a preventative measure). Vehicles for which embodiments may be utilized include but are not limited to tractor trailer vehicles (semis), passenger vehicles, city vehicles, emergency response vehicles, and aircraft vehicles on runways to decrease the landing distance needed for aircraft of any type (except vertical takeoff) or to increase or maintain traction upon aircraft takeoff (or to increase friction coefficient on the aircraft or the surface on which aircraft travel). Embodiments of the product mixture may be used to decrease the friction coefficient of runways for aircraft takeoff and landing, aircraft landing being where the airplane brakes are applied and traction is very important on the runway surface.

Embodiments include an improved product for increasing friction coefficient of a surface (e.g., a snowy and/or icy surface) or providing traction to vehicles and surfaces and getting vehicles unstuck from (or preventing them from being stuck to) a snowy, icy, or wet surface (or otherwise slippery surface). Embodiments also provide an improved product for increasing friction coefficient of a surface (e.g., a snowy or icy surface) or for maintaining, providing, or increasing traction to a snowy or icy surface (or wet or otherwise slippery surface) (e.g., a sidewalk, parking lot, or road surface) for people walking, running, or otherwise moving on that surface. The product may be used to prevent vehicles becoming stuck on a surface or people falling on a surface, or instead the product may be used to unstick an object or vehicle from a surface.

Embodiments are easier on the environment than currently available options and work faster than these currently available solutions. Environmentally, embodiments are biodegradable and will in effect self-clean in typically just a few hours. Embodiments are also less expensive and faster working than a tow truck towing away the stuck vehicle. Embodiments may be used to provide preventative maintenance insurance for vehicles, as the product of embodiments may only cost $12 to $20 per 25-pound bag, for example, versus a $1,000 or higher tow charge for the same vehicle. Embodiments may work more than twice as well as existing traction-improvement methods and formulations. On flat ground, the mixture of embodiments may provide an 85 percent traction return for 35 feet. Embodiments provide a non-toxic product fast and at an order of magnitude savings against flat-frozen environmental-towings.

Embodiments also improve traffic flow and logistical problems created by inclement weather by increasing or maintaining the traction of objects/vehicles on surfaces or increasing the friction coefficient of an object and/or surface.

City, county, state, and federal governments (and other government entities) maintain large fleets of emergency and other vehicles whose functions make our daily life easier and safer. The product of embodiments impacts these governments in at least the following two ways. Emergency response vehicles (e.g., police vehicles or ambulances) may carry a supply of the formula for use in extricating vehicles they are responding to, as well as keep their own police, ambulances, work trucks, and other cars and trucks from being stuck and unable to function. Additionally, treating areas prone to freezing (e.g., Northeastern seaboard, Rocky Mountains, and the mid-south from Atlanta to Amarillo) with this product will provide a surer surface for drivers to use, decreasing accidents (and the cost for response to these accidents) significantly.

Airports are often closed due to icy and/or snowy runways. Embodiments disclosed herein may be used to treat runways and other airport surfaces and potentially keep airports open and functioning. During icy runway conditions, embodiments of the product may help maintain the runway and other airport surfaces at the required friction coefficient to continue operations. The Federal Aviation Administration (FAA) brake coefficient test (at ERA Airlines) during icy and/or snowy runway conditions may be met using the product of embodiments, so that airplanes may continue to land and take off.

The product of embodiments works better than commonly used sand, clay, or salt in less than 6 minutes in some embodiments or less than 4 minutes in some embodiments and does not clump on tires. The product of embodiments greatly increases grip over the clay or sand alternatives. A truck driver or other vehicle operator (or other user) may apply the product of embodiments and be back on the road in approximately 15 minutes or less, decreasing downtime of the vehicle and improving safety in an efficient and effective manner.

In some embodiments, the product of embodiments is effective on packed snow, ice, and/or a frozen surface from approximately −60 degrees Fahrenheit to approximately 32 degrees Fahrenheit. Some embodiments of the product may be used to unstick vehicles of from approximately 2 tons to approximately 150 tons.

Some embodiments may include an inert powdered mixture that increases friction coefficient of a surface or object or increases or maintains traction and is designed for semi-tractor trailers of approximately 2 tons to approximately 50 tons from a temperature of approximately 32 degrees Fahrenheit down to approximately −60 degrees Fahrenheit. In some embodiments, the inert powdered mixture may be designed and used for aircraft of approximately 2 to approximately 150 tons, e.g., to prevent one or more aircraft (for example c-103 aircraft) from vibrating themselves off of the runway. In one embodiment, the inert powdered mixture may be disposed in a 25-pound bag (for example for use in the lower 48 states). In another embodiment, the mixture may be disposed in a 34-pound bucket (for example for use in Alaska and Canada), and the container or bucket may be selected both for multiple-use application and its 11 3/16-inch height (similar to a car battery size) which allows it to easily be moved in and out of the tractor stowage box. An example of a 34-pound bucket which may be used to package the product mixture of embodiments is a Ropak Packaging 3.5-gallon EZ STOR® Container E357 (the parent company of Ropak being Linpac). In some embodiments, the mixture may be designed to retain its traction properties while being pure white to not attract solar energy (e.g., for use in Alaska and Canada on semi-tractor trailers). In some embodiments, a 42-pound container may be used to store the mixture and may be selected for its multiple-use application and its height (e.g., 11 5/16"), to easily get in and out of a tractor stowage box. In some embodiments, a 12-pound bag of the mixture for increasing traction may be specifically packaged for passenger vehicles (e.g., in the lower 48 states), and the mixture may be formulated to increase traction ability of a surface or object at temperatures down to approximately −60 degrees Fahrenheit. In other embodiments, 2,250-pound laminated bi-axially oriented poly-propylene (BOPP) (e.g., 2-mil plastic lined) bulk bags of the product mixture may be for use on wider sections of the surface (e.g., concrete and/or asphalt).

The product of embodiments may easily be spread onto one or more tires of a vehicle and/or the surface (e.g., the road surface) without any undue precautions or tools. The driver of the vehicle may then drive away on a pathway of the product, which is also adhering to the tire(s) to which it has been applied.

Some embodiments of the product mixture include a non-chloride based, powdered mixture that may help tires or other objects immediately gain traction on snow and/or ice. The mixture may be used as an alternative to the other materials sometimes used on surfaces such as salt, sand, clay, bleach, and ammonia. In some embodiments, it works more than twice as well as existing traction-improvement methods.

Embodiments generally include a mixture of the ingredients pulverized lime, granite, sand (e.g., fine sand), perlite, gypsum, and dye. The dye or chalk is optional because it is added for visual effect (to add color). In some embodiments, the pulverized lime may be pulverized limestone, the granite may be granite fines, and the perlite may be expanded perlite.

Embodiments may include a mixture including the following components: pulverized lime L such as pulverized limestone, sand S such as fine sand (e.g., fine cracked sand or fine mortar sand) (the fine sand may include a percentage of silica therein), granite G such as granite fines, gypsum Y ($CaSO_4 \cdot 2.H_2O$), perlite P such as expanded perlite, and dye D such as chalk (which may be orange chalk) (the dye D is optional). These components are ultimately mixed together, in one embodiment as shown and described in FIG. 1. No chemical reaction results from the combination of these components, and the resulting mixture is a powder. In one embodiment, the mixture components include granite fines (e.g., granite powder or Donna fill), fine sand (e.g., fine cracked sand), pulverized lime, expanded perlite, dye (e.g., chalk dye or chalk), and gypsum.

In one embodiment, the components may be present in the mixture in the following percentages, as weight percent of the total mixture:

| | |
|---|---|
| pulverized lime | 56% |
| fine sand | 24% |
| granite fines | 17% |
| gypsum | 1.97% |
| expanded perlite | 1% |
| chalk | 0.03% |

The percentages listed above may be approximate. Dye may be substituted for the chalk. The components may be varied according to the following ranges, as weight percent of the total mixture (the percentages may be approximate):

| | |
|---|---|
| pulverized lime | plus or minus 5% to 8% of 56% |
| fine sand | plus or minus 5% to 8% of 24% |
| granite fines | plus or minus 5% to 8% of 17% |
| gypsum | plus or minus 5% to 8% of 1.97% |
| expanded perlite | plus or minus 5% to 8% of 1% |
| chalk | plus or minus 2% to 8% of 0.03% |

In another embodiment, the components may be present in the mixture in the following percentages, as weight percent of the total mixture:

| | |
|---|---|
| granite fines | 12.75% |
| fine sand or fine cracked sand | 10.25% |
| pulverized lime or pulverized limestone | 73.90% |
| gypsum | 2.02% |
| expanded perlite | 1.00% |
| dye | 0.08% |

The percentages listed above may be approximate. The dye may be chalk. The components may be varied according to the following ranges, as weight percent of the total mixture (the percentages may be approximate):

| | |
|---|---|
| granite fines | plus or minus 5% to 8% of 12.75% |
| fine sand or fine cracked sand | plus or minus 5% to 8% of 10.25% |
| pulverized lime or pulverized limestone | plus or minus 5% to 8% of 73.90% |
| gypsum | plus or minus 5% to 8% of 2.02% |
| expanded perlite | plus or minus 5% to 8% of 1.00% |
| dye | plus or minus 5% to 8% of 0.08% |

In another embodiment, the components may be present in the mixture in percentages of the following ranges, as weight percent of the total mixture (all percentages are approximate):

| | |
|---|---|
| pulverized lime or pulverized limestone | 56% to 74% (or 56% to 75%, or 65% plus or minus 8%) |
| fine sand or fine cracked sand | 10% to 24% |
| granite fines | 13% to 17% |
| gypsum | 1.9% to 2.2% |
| expanded perlite | 0.8% to 1.2% |
| dye | 0.03% to 0.08% |

In all of the embodiments included herein, the dye or chalk is an optional component of the mixture. If the dye or chalk is not included in the mixture, the percentages of the components in the product mixture may be adjusted accordingly.

The pulverized lime may be, for example, Batesville lime #270. The fine sand or fine cracked sand may be, for example, fine mortar sand, which may have less than 12% humidity and be cracked and sifted (150-). (The 150- is as understood by the screening and sifting rock community, meaning the fine mortar sand in this example is a 150-screen size or smaller and the "-" after the 150 means that all sizes are included that are smaller than 150 such as 200, 250, 300, 350, etc.) The granite fines may be, for example Donna Fill® or nepheline syenite granite fines, a by-product of crushing syenite granite rock. The granite fines may be, for example, 3M bag house fines from granite mining operations. The expanded perlite may be, for example, from any expanded perlite manufacturer of ambient minerals. In some embodiments, expanded perlite is formed by heating perlite to 1000 degrees Fahrenheit, producing the expanded perlite properties which provide an air space for the dye to encapsulate and block the humidity. The dye may be, for example, chalk dye such as fluorescent orange chalk dye or other orange chalk dye (or any other color), e.g., Keson® brand chalk, or Irwin® brand chalk (e.g., Irwin® marking chalk level 2).

The mixture of embodiments may be a granular substance which increases friction coefficient of a snowy and/or icy object or surface and may help one or more tires maintain, gain, or regain traction in snow and/or ice.

The product mixture operates to increase traction by mechanically removing the water and increasing the friction coefficient from the mechanical interaction of the vulcanized rubber (or other material of the object or vehicle) against a frozen water surface. In the mixture, the granite fine may be substituted with black Iowa fine. The granite (e.g., granite fine) is not reactive and inert and used for color and consistency and may be bag house granite. The fine sand is preferably greater than 95 or 100 screen and very fine. The lime (e.g., pulverized lime or limestone, which may be powdered limestone) acts to suck the water out of the ice/snow and grabs onto the tire. The expanded perlite creates a dry spot for grip, and the gypsum sucks the water out of the ice/snow.

FIG. 1 shows one embodiment of a system and method for making the mixture of embodiments. As illustrated in FIG. 1, the following components are mixed together in the desired ratios to form a first mixture: granite fines G, fine sand S, pulverized lime L (e.g., pulverized limestone), and gypsum Y. The components may each be housed in separate bins 5 (for the pulverized lime L), 10 (for the fine sand S), 15 (for the granite fines G), and 20 (for the gypsum Y) or other holding vessels. The pulverized lime L, fine sand S, granite fines G, and gypsum Y are removed from the bins 5, 10, 15, 20 and may be placed through an optional screen 35 (e.g., course screen) or other screening or separation device which removes particles of a threshold size from the mixture M1 resulting from the mixing of the pulverized lime L, fine sand S, granite fines G, and gypsum Y. These four components may be pre-screened to the coarse screen 35 to prevent any large-object contaminants from being present in the mixture. (In some embodiments, a screen may be combined or with or integrated with as part of a mixer for mixing the materials pulverized lime L, fine sand S, granite fines G, and gypsum Y with one another, and in other embodiments, the screen is replaced with only a mixer for mixing the components with one another to form mixture M1.)

An optional heater 45 may be located downstream from the mixture M1 to allow for optional heating of the mixture M1 to remove moisture from the mixture M1 if needed (and to heat and crack the mixture M1). The heater 45 in some embodiments is only utilized if the percentage of the humidity in the fine sifted mortar sand is above approximately 10 percent to approximately 12 percent. In some embodiments, the mixture M1 may be heated in the heater 45 and dried to reduce the moisture content to under approximately 12%, plus or minus 0-5%. The heater 45 may be any type of heater known to those skilled in the art for heating generally dry materials to reduce their moisture content.

Separately from the mixture M1, the optional dye D (e.g., chalk which may be orange chalk) and the expanded perlite P may be mixed together in the desired ratios to form a second mixture M2. The dye D and expanded perlite P may be mixed together in a mixer 50, for example a 1-yard mixer. The mixer 50 may be any mixer known to those skilled in the art for mixing dry materials with one another.

The components in the mixture M1 and the components in the mixture M2 should be mixed separately from one another prior to mixing the two mixtures together so that the humidity of the expanded perlite P attracts the dye D. The expanded perlite P may include 18-34 percent humidity by weight (values may be approximate). Perlite balls (in one example, bright orange perlite balls, but the color depends upon the color of the dye D or chalk mixed with the perlite P) are formed. A secondary benefit of fine-dye covered expanded perlite is that the air space contained in each of the perlite spheres introduces hundreds of dry air spaces for the tire(s) of the vehicle to adhere to (or for the object to adhere to), increasing traction. If the mixture M1 and the mixture M2 are not mixed separately from one another prior to mixing the two mixtures together (and instead all of the components are mixed together in one mixing step), the granite encapsulates the perlite instead of the chalk dye D so that the mixture looks similar to mud rather than visually representing the color of the dye D. Providing a noticeable color to the mixture using the dye allows the product mixture to be visible when applied to the surface and/or object to warn people that a substance is disposed on the surface and/or object.

In the alternative embodiment where the dye D or chalk is not included in the product mixture, the expanded perlite P would not need to be separately mixed with the dye D prior to its mixture with the other four components of the mixture M1.

The first mixture M1 and second mixture M2 are then combined with one another in a mixer 45, which may be a 10-yard mixer in one example. The first mixture M1 and second mixture M2 may be mixed together for approximately 10 minutes to approximately twelve minutes.

The resulting final mixture M3 may then be transferred to a hopper 55 (e.g., a 15-20 yard hopper) or to another storage device for bagging or placement in another type of container (or instead may be transferred directly to the container, e.g., bag or bucket). Bagging of the product M3 may for example occur at a 12-pound bag bagger 65 and/or a 25-pound bag bagger 70, and the bags containing product M3 are prepped for loading (and may be transferred to a warehouse 75 or other location). Bagging or other packaging of the product (e.g., in a bucket) may be manual or automatic, with typical bagging or other packaging systems and methods known to those skilled in the art. The bags may be loaded at a 3-22 (12 pound or 25 pound) bag per minute rate. Optionally, gloves G (e.g., from a storage bin 60), may be introduced to one or more of the baggers 65, 70 to include in the bags. The gloves G may be pre-bagged and may be standard gloves (e.g., standard disposable gloves) known to those skilled in the art.

The hopper, baggers, and warehouse are optional components of the system of embodiments. If a bucket or other type of container for placing the product therein is utilized to package the product mixture (e.g., the 34-pound bucket or 2250-pound bulk bag), other bagging or packaging devices or methods which package the product in the bucket or 2250-pound bag or other container may be placed in the system shown in FIG. 1 in lieu of the 12-pound bagger 65 and/or 25-pound bagger or may instead be added as a flow option for the mixture M3 from the hopper 55 and/or mixer 45 in addition to the two baggers 65, 70 (e.g., between the hopper 55 and the warehouse 75) (gloves G, which may be from the bin 60, may also be introduced to the additional baggers or bucket packaging devices). In FIG. 1, the dotted lines show an optional bucket packaging system component 71 and an optional 2250-pound bagger 72 which may be included in some alternate embodiments. It is within the scope of embodiments to include packaging components and/or methods in the system which accommodate any sizes of bags, buckets, or other containers in which the product mixture M3 is or may be placed.

In one example of embodiments, the bag for containing the product M3 is a plastic 8 mil bag having two to three holes in the top of the bag for carrying. The tough 8 mil packaging of the bag allows the bag to take truck-box abuse without compromising the product mixture M3. The bag in some embodiments is double-sealed to reduce the chance that it will break open and compromise the product M3 prior to its use. Optionally, two gloves G may be included in a separate bag such as a 3 inch to 4 inch bag disposed within the product-containing bag to keep the components from dirtying the user's hands upon use of the product M3.

In an embodiment, the product-containing bag may have a net weight of 25 pounds and be approximately 12 inches in width and approximately 18 inches in height. In some embodiments, the bag may include one or more gloves G along with the product M3 therein and have directions for application and use of the product M3 on the bag (or in the bag) with a depiction of what a vehicle tire should look like when the product M3 is applied correctly (e.g., a picture may be located on the back of the bag).

In one example, the amount of the product mixture M3 provided in the 25-pound bag may be the volumetric calculation needed to cover $\frac{1}{16}$ inch of an inch around each of eight drive tires (e.g., of a tractor trailer) that are six inches wide and 10.5 feet in circumference plus 10 feet of six inches wide by $\frac{1}{16}$-inch rollout covering (all values may be approximate). In another example, the amount of the product mixture M3 provided in a 12-pound bag may be the volumetric calculation that there are only two to four drive tires per passenger vehicle versus the eight drive tires for trucks, so roughly only 12 pounds are needed or ½ of the product mixture M3 included in the 25-pound bag calculation in the previous sentence.

Figure 7:
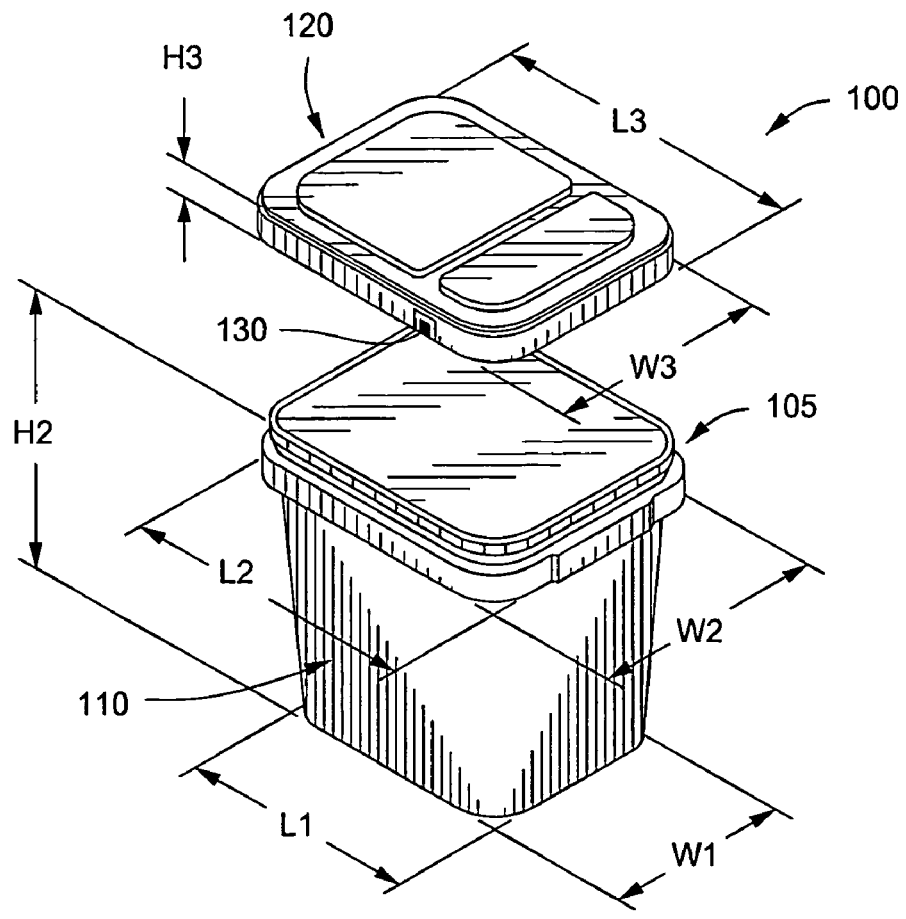
FIG. 7 shows an embodiment of a container for the mixture of embodiments.

In another embodiment, the product M3 may be packaged into a container such as a bucket, e.g., a common utility bucket or a bucket 100 as shown in FIG. 7 which may be for example a 34-pound bucket. In this embodiment, the baggers 65, 70 may be replaced with bucket (or other container) filling devices or methods. In some embodiments, the bucket 100 may include one or more gloves along with the product therein (which may be in a separate bag within the bucket 100 or a separated portion of the bucket 100) and have directions for application and use of the product on the bucket 100 (e.g., on the top of a lid 120 of the bucket 100) or in the bucket 100 with a depiction of what the a vehicle tire should look like when the product M3 is applied correctly. The bucket 100 may optionally have a solid 80 mil thickness. In one exemplary embodiment not limiting of embodiments, the bucket, such as shown in FIG. 7, may be from the company Ropak Packaging in Fountain Valley, Calif. (a member of the Linpac Group of Companies) and may be the 3.5-gallon EZ STOR® Container with Hinged Cover, the container having the product code E357 with the lid being the hinged cover having the product code E4DH, with an optional carrying handle, built in hand grips. The E4DH hinged cover may be have the following features: dry seal, tamper-evident, hinged, easy (EZ) open and close cover.

The bucket 100 may include a base 110 for placing the product M3 therein and a lid 120 for connection with the base 110 to enclose the product M3 in the bucket 100. The base 110 may include a lip 105 around an upper portion thereof. The bucket 100 may optionally include a carrying handle.

$$9\frac{15}{16}$$

In one example, dimensions of the bucket may be 12 inches in length×
inches in width×

$$11\frac{5}{16}$$

inches in height (all dimensions may be approximate), so that it may fit in the truck-box. The bucket may include a Ring Pull® feature 130 on its lid 120 to intuitively point out the means and method for lid removal from the base 110 to the user and allow for removal of the lid 120 from the base 110 by pulling the Ring Pull® feature 130. Upon the user undoing the Ring Pull® feature 130, the slip lid 120 may pop up (e.g., like a Spam® can). Any other device known to those skilled in the art which is capable of removably attaching the lid 120 to the base 110 and allows the user to remove the lid 120 from the base 110 to get to the product M3 disposed within the base when desired is within the scope of embodiments.

Example dimensions of the base 110 (which are not limiting of embodiments) are as follows: length L1 may be approximately $$10\frac{1}{16}$$

inches, length L2 may be approximately 12 inches, width W1 may be approximately $$8\frac{1}{16}$$

inches, width W2 may be approximately $$9\frac{15}{16}$$

inches, and height H2 may be approximately $$10\frac{13}{16}$$

inches. Example dimensions of the lid 120 (which are not limiting of embodiments) are as follows: length L3 may be approximately inches, width W3 may be approximately $9\frac{3}{4}$ inches, and height H3 may be approximately $1\frac{3}{8}$ inches. The total height of the bucket 100 when the lid 120 is connected to the base 110 may be approximately 11.75 inches. The dimensions described herein in relation to FIG. 7 are merely exemplary and not limiting of embodiments.

The amount of the product mixture M3 provided in the 34-pound bucket may provide for multiple uses of the product mixture M3 per container for either semi-tractor trailers or passenger vehicles.

Any other packaging known to those skilled in the art capable of securely storing the product mixture M3 therein may be utilized with embodiments, and the examples of packaging disclosed herein are not limiting of embodiments.

As an alternative to the process and system described above of making the product mixture, one or more Archimedes screws may be used, where a different screw rotates to deliver each element of the mixture into a mixer below the screws at various rates of delivery for each component (which corresponds with the rate of rotation of each screw), according to the percentage of the component desired in the ultimate product mixture. Different screws may deliver the four components of the first mixture M1 into a mixer and the two components of the second mixture M2 into another mixer, and then ultimately deliver the two mixtures M1 and M2 into a mixer or other trough to produce the product mixture M3. In another embodiment, one or more toothed belts may be substituted for the Archimedes screws. Ultimately, either method and system operates to deliver a certain volume of the components pulverized lime L, fine sand S, granite fines G, and gypsum Y into a first mixer or other trough at a certain speed and a certain volume of the components expanded perlite P and dye D into a second mixer or other trough at a certain speed and a certain volume of the mixtures M1 and M2 resulting from these components at a certain speed into a third mixer or other trough to produce the product mixture M3. When one or more toothed belts are utilized, one or more of the belts may travel at a speed of approximately 3 miles per hour, for example. When one or more Archimedes screws are used, one or more of the screws may travel at a speed of approximately 2.7 miles per hour, for example.

The size or color of the mix bins (in any of the embodiments disclosed herein) and the volume and mechanism for the transfer conveyors or screws do not affect the performance of the product mixture; therefore, any size or color of the mix bins and mechanism known to those skilled in the art may be utilized with embodiments. Additionally, any types of mixers or mix bins (and mixing devices such as stirrers) which are known to those skilled in the art for mixing dry materials with one another may be included in the system and used to mix together the components in the mixtures M1, M2, and M3. However, high speed mixers may create too much dust.

Figure 2:
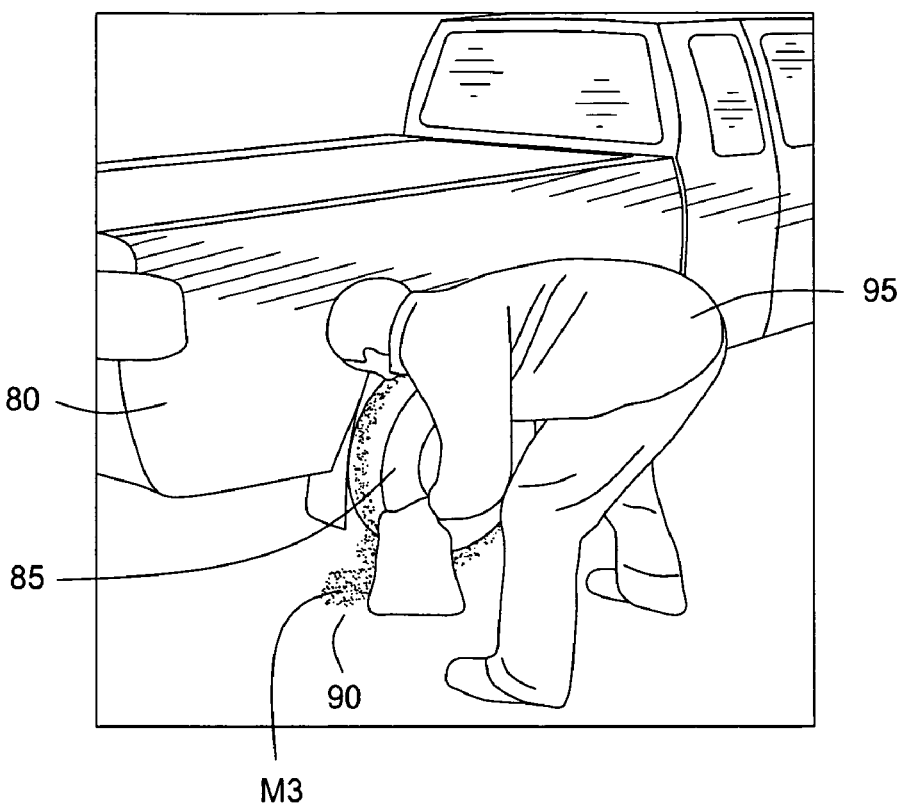
FIGS. 2-6 show steps in use of embodiments of the mixture to provide traction to a vehicle relative to a surface.

FIGS. 2-6 illustrate an embodiment of a method of applying the resulting product mixture M3 to one or more tires 85 of a vehicle 80 to unstick the vehicle 80 from an icy and/or snowy surface 90. First, bulk snow/ice is cleared from in front of the vehicle's tire(s) 85. Optionally, if desired, the person 95 applying the mixture M3 may place gloves G on his or her hands prior to its application. As shown in FIG. 2, the final mixture M3 or substance is placed behind the tire(s) 85. In one embodiment, one to two handfuls of the final mixture M3 are placed directly behind each drive tire.

Figure 3:
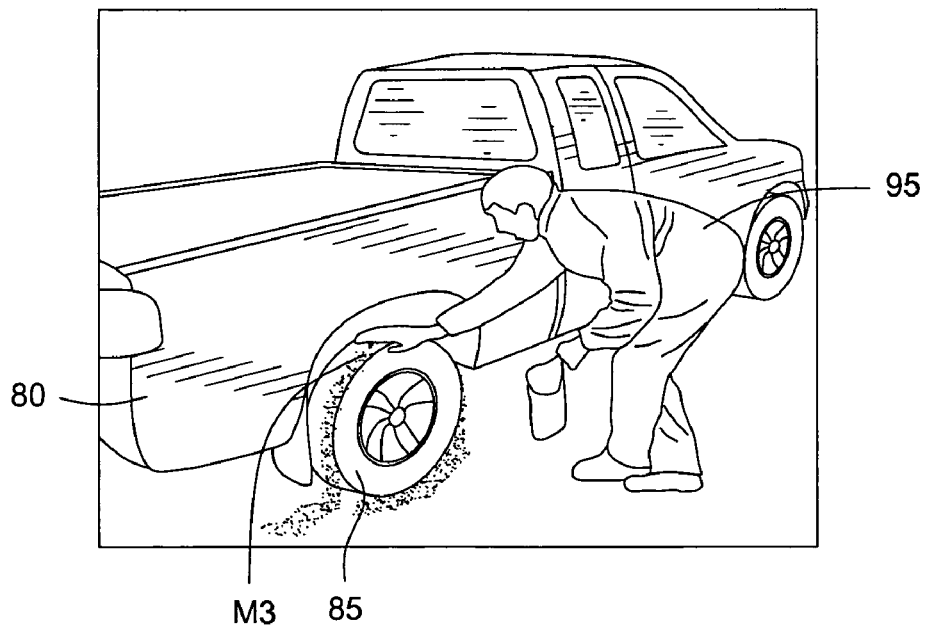
Figure 4:
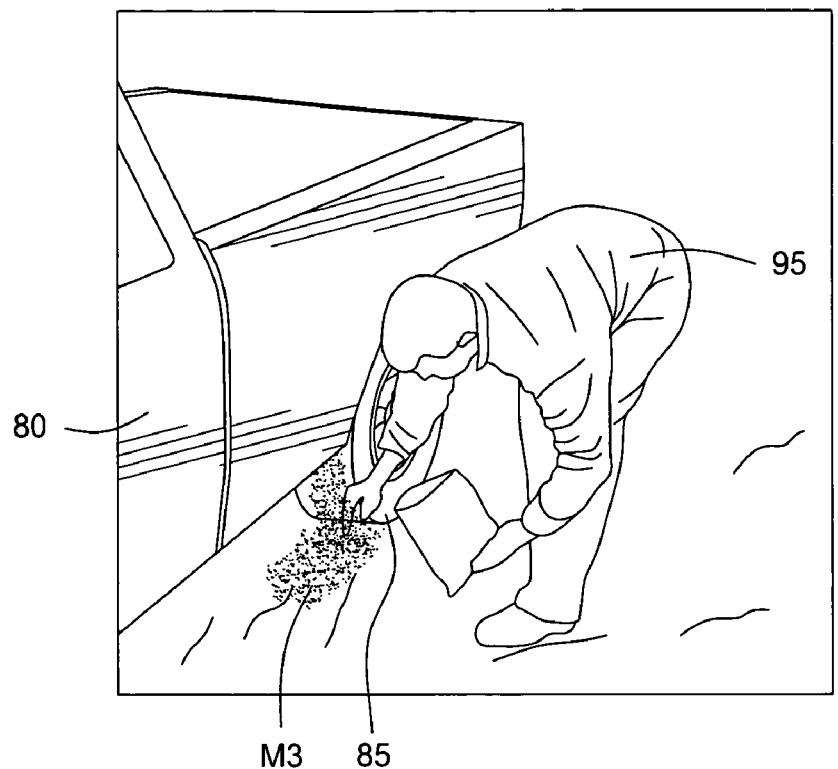
Figure 5:
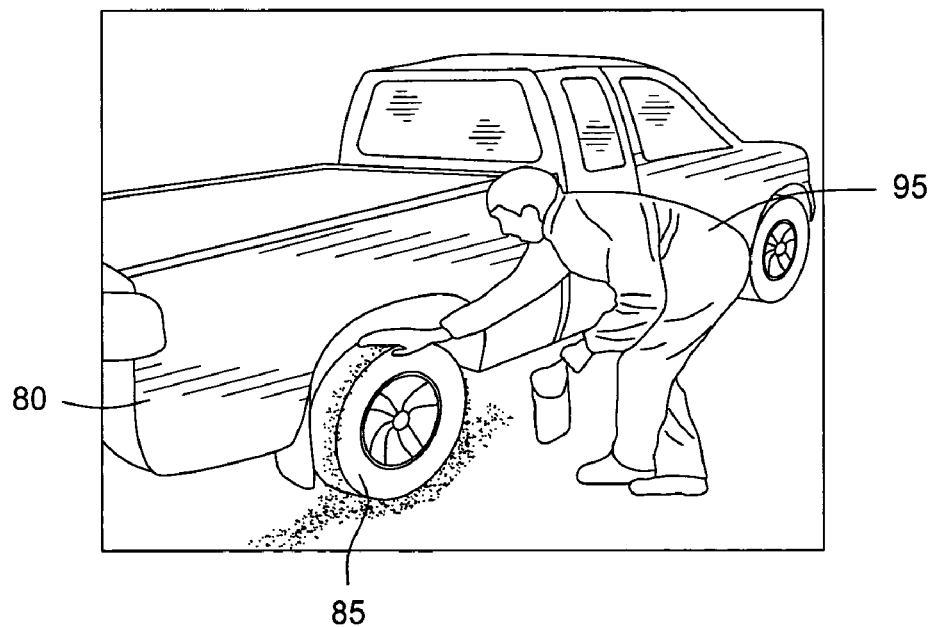

As shown in FIG. 3, the person 95 then coats the tire(s) 85 with the mixture M3 or substance, a complete 360 degrees around the tire 85 (or coats the treads of the drive tire(s) 85 with the mixture M3). The driver then backs the vehicle 80 up until the wheels are directly on top of the handfuls thrown down behind each drive tire, in one example the driver backing up approximately 4 inches to approximately 6 inches. Next, the mixture M3 is placed in front of the tire(s) 85, as shown in FIG. 4. In one embodiment, one to two handfuls of the mixture M3 are placed in front (for example directly in front) of each drive tire. The person 95 may then optionally ensure that the tire(s) 85 are coated 360 degrees all around the portion of the tire(s) 85 which contact a surface (or the tire treads) with the product M3, as shown in FIG. 5, and add the product mixture M3 to any uncovered portions of the tire(s) 85 surface-contacting circumference (or the tire treads). (Of course, it is also within the scope of alternate embodiments that the method may instead include first placing the mixture M3 in front of the tire(s) 85 and then placing the mixture M3 behind the tire(s) 85.)

Figure 6:
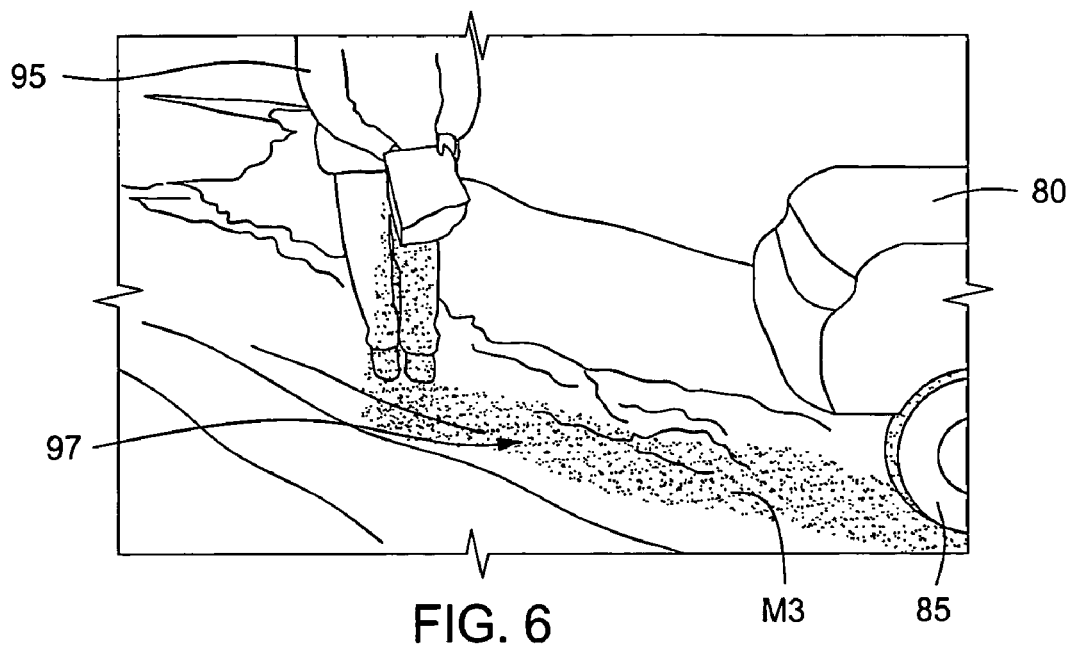

Next, one or more paths 97 are created such as the ones shown in FIG. 6 in front of each of the drive tire(s) in the intended direction of travel of the vehicle 80. In one embodiment, paths 97 are created in front of each of the drive tires 85 with the product in front of each of the drive tires 85 in the intended direction (where the bulk snow was cleared away from in front of the tires 85). For example, in one embodiment, a person 95 disposes approximately 20 feet to approximately 25 feet of approximately 4 inch-wide to approximately 6-inch-wide paths 97 of the product M3 in front of each of the drive tires 85 in the intended direction of vehicle travel. The driver then should drive away as if on wet pavement, apply light gas, and should not hesitate, pause, or stop.

Some sample directions for use of the product M3 to provide traction for a vehicle on a surface are listed below:
1. Clear the bulk snow away from in front of the tires (if necessary).
2. Put on gloves (optional).
3. Throw (or place) 1-2 handfuls of the product mixture M3 directly behind each drive tire.
4. Cover each drive tire a complete 360 degrees around with the product mixture M3.
5. Back up truck four inches to six inches so wheels are directly on top of the handfuls thrown down.
6. Throw (or place) 1-2 handfuls in front of each drive tire.
7. Ensure each drive tire is well coated all around 360 degrees.
8. Lay 20-25 feet of 4-6 inch wide paths of the product mixture M3 in front of each of the drive tires in the intended direction (where you cleared in step #1).
9. Plan your getaway path (optional).
10. Drive away as if on wet pavement, apply light gas, do not hesitate, pause, or stop.

Other sample directions include the following:
1. Plan your getaway path.
2. Clear the bulk snow and slush from in front of the tires along it (if necessary).
3. Put on gloves (optional).

4. Throw (or place) 1-2 handfuls of the product mixture M3 directly behind each of the drive tires.
5. Cover the treads of each drive tire with the product mixture M3 (or this step may instead include covering each drive tire with the product mixture M3).
6. Back truck (or other vehicle) up 4-6 inches so wheels are directly on top of the handfuls thrown down.
7. Throw (or place) 1-2 handfuls in front of each drive tire.
8. Ensure each drive tire's tread is well coated. (This step may instead be "Ensure each drive tire is well coated all around 360 degrees.")
9. Lay 10-20 feet of 4-6 inch wide paths of the product mixture M3 in front of each of the drive tires in the intended direction previously cleared.
10. Drive away as if on wet pavement, apply light gas, do not hesitate, pause or stop.

Yet other sample directions for use may include the following:
1. Plan your getaway path.
2. Clear the bulk snow and slush from in front of the tires along it (if necessary).
3. Put on gloves (optional).
4. Throw (or place) 1-2 handfuls of the product mixture M3 directly behind each of the drive tires.
5. Cover the treads of each drive tire with the product mixture M3.
6. Back truck (or other vehicle) up 4-6 inches so wheels are directly on top of the handfuls thrown down.
7. Throw (or place) 1-2 handfuls in front of each drive tire.
8. Ensure each drive tire is well coated all around 360 degrees.
9. Lay 8-10 feet of 4-6 inch wide paths of the product mixture M3 in front of each of the drive tires in the intended direction (where you cleared in step #2).
10. Drive away as if on wet pavement, apply light gas, do not hesitate, pause or stop.

The steps in the above directions may be removed or combined in embodiments and are not limiting of the application and use of the product mixture. Any of the directions which involving coating the tire(s) or the treads 360 degrees or all around 360 degrees may instead involve coating the tire(s) or treads substantially 360 degrees all around or effectively 360 degrees all around, in an effective amount to provide sufficient product mixture M3 around the tire(s) to provide sufficient traction or friction coefficient on the surface to unstick or prevent sticking of the vehicle on the surface.

The product mixture M3 may be applied to any other snowy and/or icy object and/or surface by placing the product mixture on the object and/or surface or coating the object and/or surface with the product mixture to increase the friction coefficient of the object and/or surface.

Other embodiments may include increasing the amount of the pulverized lime in the mixture above 56%, but as the other ingredients are removed the combination may become less effective.

The product should be stored in a dry place.

Examples of use of an embodiment of the product mixture are as follows. For a loaded truck jackknifed on a road, application of an embodiment of the product mixture unstuck the truck in less than five minutes. For a truck stuck in a parking lot on ice, application of an embodiment of the product mixture unstuck the truck in under six minutes. The product permits unsticking of the truck in less than five to six minutes.

Example 1

On an asphalt surface having approximately 5-6% uphill incline and approximately 1 inch of packed snow and ice thereon, a truck completely stopped at a red light was loaded with approximately 40,000 pounds and had no chains on its tires. After application of approximately 25 pounds of an embodiment of the product mixture in one application, the truck was unstuck in approximately 5 to 6 minutes, and the tires gripped the snow so much that the packed snow actually broke free from the asphalt.

Example 2

When many vehicles were sliding down a hill on a road surface (2 passenger cars had slid down the hill sideways and came to rest against a curb), 3-4 of the 25-pound bags of an embodiment of the product mixture were used according to the directions to coat the path for the travel of two semi trucks stopped at the top of the hill. The road was covered with two tracks down the hill with an embodiment of the product, and the hill was uncongested in approximately 4 to 5 minutes and the trucks were back on their way.

Example 3

An embodiment of the product was used to coat the road described in Example 2 in front of a bus to provide the grip necessary to prevent the bus from sliding into the resting passenger cars.

Example 4

A food truck was stopped at an intersection for a light. It began moving again, but only traveled about 20 feet before the entire tractor rig slid back down and blocked the intersection with about 53 feet of loaded trailer. The truck was fully blocking the intersection. After following the directions and applying an embodiment of the product to the road, in approximately 4 to 5 minutes the truck was on its way up an approximately 7 percent incline after being at a complete stop. After applying an embodiment of the product to the rest of the intersection, the traffic was free-flowing in another approximately 5 to 6 minutes. Without the product, this incident could easily have cost the truck's owner or operator $500 or more as well as an hour or more of lost logistics time.

Example 5

At a side street by a store having about a 5-6 percent uphill grade at an intersection with a traffic light, ditch on either side, where you have to turn out onto a flat surface, a truck stopped at a light and subsequently tried to move forward but just spun the tires, even when the power divider was locked in. Using approximately 25 pounds of an embodiment of the product, a small handful of an embodiment of the product was thrown behind each set of drive tires, a small handful was thrown in front of each set of drive tires, and the drive tires were each coated completely around. Approximately 10 to approximately 12 feet of runoff was thrown in front of each set of drive tires. The truck was rolled backwards by a driver about 4 to 6 feet, placing the drive tires on top of the handfuls that were thrown down behind the drive tires and allowing the embodiment of the product to be rubbed on the portion of the tire that was on the ground and thrown on the portion of the ground where the tires had originally been located. The driver then drove the truck slowly, as if driving away on wet pavement, trying not to spin the tires. No spin of the tires resulted, despite the slope of the road, and the tires never broke loose. The time to unstick the truck with this embodiment of the product was approximately less than seven minutes.

The product mixture M3 of embodiments does not degrade and does not hard cake before using. The product mixture M3 is also environmentally safe (actually reverses acid soil buildup most prevalent in the industrial areas of the northeast and east coast); therefore, the product mixture M3 may be left on the surface (e.g., the road surface) without damaging the environment. Embodiments advantageously provide a non-chloride containing, non-acidic product. The mixture product may be a powdery substance.

The mixture product M3 may be used on sidewalks parking lots, and/or other surfaces on which pedestrians travel (e.g., outside restaurants or other businesses or buildings) to instantly or quickly render the ice and/or snow on the sidewalks, parking lots, and/or other surfaces on which pedestrians travel non-slippery.

The product mixture M3 is not meant to melt ice or snow, but is meant to simply increase friction coefficient on a surface or object and to maintain, increase, or provide traction on whatever is on the ground or other surface that is making a vehicle, person, or other object slip. It is generally not used in grassy or muddy areas, and is most effective on frozen surfaces with packed snow or ice.

The product mixture M3 generally does not take longer than 6 minutes to unstick a tractor-trailer and generally does not need to be applied twice. Some exemplary applications of embodiments, which are not limiting of embodiments, include unsticking the following: food service (loaded double tandem) uphill at a stoplight from road; petroleum tanker (loaded double tandem) on the highway and in a gas station; furniture (loaded single tandem) from bridge or other surface; passenger automobiles from a surface; an object from a sidewalk with ice or snow on it (e.g., ⅛"-¾"+ of ice).

One or more weighing mechanisms such as one or more scales (e.g., commercial scales) may be used to weigh the components or any of the mixtures M1, M2, M3 at any point of the process. The weighing mechanism(s) may be connected to an automated system for communicating the weight from the scale with a computer processor (e.g., using one or more electrical cords between the scale and the processor or wireless communication between the scale and the processor), in some embodiments calculating with the processor the amount of components required to produce the desired percentages of components in the final mixture M3, and communicating from the processor to the automated system delivery devices (e.g., using one or more electrical cords between the processor and the automated system delivery devices or wireless communication between the processor and the automated system delivery devices) the calculated amount to ensure that the correct amount of the components is introduced into the mixtures M1, M2.

Although this description generally refers to unsticking an object from a surface using the product mixture M3, it is also within the scope of embodiments that the product mixture M3 may be applied to an object and/or a surface as a preventative measure to prevent sticking of the object on the surface or to increase the gripping or traction ability of an object on the surface.

The mixture may be a composition of matter in some embodiments. The numbers (dimensions, percentages, temperatures, etc.), amounts, and values disclosed herein may be either absolute or approximate, regardless of how they are stated.

All of the percentages disclosed herein are by weight, e.g., the percentages of components in the mixtures M3 are weight percents of the total mixture M3, unless otherwise noted herein.

Some embodiments include a method comprising mixing pulverized lime, fine sand, granite fines, and gypsum with one another to form a first mixture; and mixing expanded perlite with the first mixture to provide a product mixture for increasing friction coefficient on a surface or object or increasing or maintaining traction of an object on a surface. In some embodiments, the method further comprises mixing expanded perlite with dye to form a second mixture prior to adding expanded perlite to the first mixture; and mixing the second mixture with the first mixture to provide a product mixture for increasing friction coefficient on a surface or object or increasing or maintaining traction of an object on a surface. In some embodiments, the method further comprises disposing the product mixture on the object or the surface to increase the friction coefficient on the surface or object or to increase or maintain traction of the object on the surface. In some embodiments, the object is a vehicle tire and disposing the product mixture on the object comprises coating the vehicle tire with the product mixture.

In any and all of the embodiments disclosed herein, the product mixture M3 and its method of use may increase the friction coefficient of a surface having snow and/or ice thereon. Increasing the friction coefficient of a surface having snow and/or ice thereon provides, increases, or maintains traction of an object when it moves with respect to the surface. In some embodiments, the friction coefficient of the surface with snow and/or ice thereon increases to an amount which allows the object to have sufficient traction on the surface to perform the desired movement of the object (e.g., for the vehicle to become unstuck, for the vehicle tire(s) to stop spinning, for the person to not slip on the sidewalk or other surface, etc.) In several embodiments, the friction coefficient is increased by the product M3 and its method of application enough so that vulcanized rubber such as that on vehicle tires or other tires has sufficient traction with respect to the surface to allow the vehicle to become unstuck and/or to prevent a vehicle from becoming stuck.

While the foregoing is directed to embodiments of the present invention, other and further embodiments of the invention may be devised without departing from the basic scope thereof, and the scope thereof is determined by the claims that follow.

The invention claimed is:

1. A mixture for increasing a friction coefficient of a surface, comprising pulverized lime, fine sand, granite fines, gypsum, and expanded perlite.

2. The mixture of claim 1, wherein increasing the friction coefficient comprises increasing or maintaining traction of an object on the surface.

3. The mixture of claim 1, wherein the surface has snow or ice thereon.

4. The mixture of claim 1, further comprising dye.

5. The mixture of claim 4, wherein the dye comprises chalk.

6. The mixture of claim 1, wherein the mixture comprises from approximately 56 percent to approximately 74 percent pulverized lime.

7. The mixture of claim 6, wherein the mixture comprises from approximately 10 percent to approximately 24 percent fine sand.

8. The mixture of claim 7, wherein the mixture comprises from approximately 13 percent to approximately 17 percent granite fines.

9. The mixture of claim 8, wherein the mixture comprises from approximately 1.9 percent to approximately 2.2 percent gypsum.

10. The mixture of claim 9, wherein the mixture comprises from approximately 0.8 percent to approximately 1.2 percent expanded perlite.

11. The mixture of claim 1, wherein the mixture comprises from approximately 10 percent to approximately 24 percent fine sand.

12. The mixture of claim 1, wherein the mixture comprises from approximately 13 percent to approximately 17 percent granite fines.

13. The mixture of claim 1, wherein the mixture comprises from approximately 1.9 percent to approximately 2.2 percent gypsum.

14. The mixture of claim 1, wherein the mixture comprises from approximately 0.8 percent to approximately 1.2 percent expanded perlite.

15. The mixture of claim 1, wherein the mixture further comprises from approximately 0.03 percent to approximately 0.08 percent dye.

16. A method comprising:
   mixing pulverized lime, fine sand, granite fines, and gypsum with one another to form a first mixture; and
   mixing expanded perlite with the first mixture to provide a product mixture for increasing a friction coefficient of a surface.

17. The method of claim 16, further comprising applying the product mixture to snow or ice located on the surface to increase the friction coefficient of the surface.

18. The method of claim 17, wherein increasing the friction coefficient of the surface comprises increasing or maintaining traction of an object on the surface.

19. The method of claim 18, further comprising:
   mixing the expanded perlite with dye to form a second mixture prior to adding expanded perlite to the first mixture; and
   mixing the second mixture with the first mixture to provide a product mixture for increasing the friction coefficient of the surface.

20. The method of claim 19, further comprising reducing the humidity of the first mixture to below approximately 12 percent prior to mixing the second mixture with the first mixture.

* * * * *